(12) United States Patent
Chen

(10) Patent No.: US 12,530,250 B2
(45) Date of Patent: *Jan. 20, 2026

(54) ELECTRONIC APPARATUS FOR LOGGING, NON-TRANSITORY COMPUTER-READABLE RECORD MEDIUM FOR LOGGING, AND LOGGING METHOD

(71) Applicant: Getac Technology Corporation, New Taipei (TW)

(72) Inventor: Xiao-Jyun Chen, Taipei (TW)

(73) Assignee: Getac Technology Corporation, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,233

(22) Filed: Jul. 22, 2024

(65) Prior Publication Data

US 2025/0217221 A1    Jul. 3, 2025

(30) Foreign Application Priority Data

Dec. 29, 2023   (CN) .......................... 202311845299.6

(51) Int. Cl.
*G06F 11/00* (2006.01)
*G06F 3/041* (2006.01)
(Continued)

(52) U.S. Cl.
CPC ........ *G06F 11/0766* (2013.01); *G06F 3/0412* (2013.01); *G06F 3/04842* (2013.01); *G06F 11/0751* (2013.01)

(58) Field of Classification Search
CPC ............. G06F 11/0766; G06F 11/0751; G06F 11/0778; G06F 11/3476; G06F 3/0412; G06F 3/04842
See application file for complete search history.

(56) References Cited

U.S. PATENT DOCUMENTS 8,330,773 B2 * 12/2012 Nielsen .................. G06F 40/103
345/619
10,078,412 B2 * 9/2018 Chana .................... G06F 3/0484
(Continued)

FOREIGN PATENT DOCUMENTS

| CN | 108491310 A | 9/2018 |
|----|-------------|--------|
| CN | 109597799 A | 4/2019 |
| TW | 201525687 A | 7/2015 |

OTHER PUBLICATIONS

European search opinion for EP4579465 (Year: 2025).*
(Continued)

*Primary Examiner* — Elmira Mehrmanesh
(74) *Attorney, Agent, or Firm* — Cooper Legal Group, LLC

(57) ABSTRACT

The present invention provides an electronic apparatus, a non-transitory computer-readable record medium, and a logging method. The logging method is stored on the non-transitory computer-readable record medium and executed by the electronic apparatus. The method includes: recording a log into a log document with an enabling button; shrinking a program of the logging method to background with a shrinking button and generating a floating window toolbar, where the floating window toolbar includes the enabling button and at least one system exception capture button; determining whether the electronic apparatus has experienced an exception; executing an exception annotation with the at least one system exception capture button when a determining result is yes; storing the exception annotation into a time series of the log document; determining whether there is the exception annotation in the log document; and displaying a log segment corresponding to the exception annotation when a determining result is yes.

9 Claims, 3 Drawing Sheets

(51) Int. Cl.
*G06F 3/04842* (2022.01)
*G06F 11/07* (2006.01)

(56) References Cited

U.S. PATENT DOCUMENTS

| | | | |
|---|---|---|---|
| 10,296,444 B1* | 5/2019 | Choudhary | G06F 11/3696 |
| 10,587,555 B2 | 3/2020 | Machol et al. | |
| 10,649,634 B2* | 5/2020 | De Paula | G06F 3/048 |
| 2002/0087949 A1* | 7/2002 | Golender | G06F 11/323 |
| | | | 714/E11.181 |
| 2009/0055443 A1 | 2/2009 | Miyamoto et al. | |
| 2010/0229112 A1 | 9/2010 | Ergan et al. | |
| 2013/0173351 A1* | 7/2013 | Livne | G06Q 10/06395 |
| | | | 705/7.38 |
| 2014/0133692 A1* | 5/2014 | Spata | G06F 11/3476 |
| | | | 382/100 |
| 2014/0237304 A1* | 8/2014 | Lai | G06F 11/0742 |
| | | | 714/57 |
| 2018/0018307 A1 | 1/2018 | Wu et al. | |
| 2023/0088164 A1* | 3/2023 | Varada | G06F 11/3698 |
| | | | 717/123 |
| 2023/0327480 A1 | 10/2023 | Dustman | |

OTHER PUBLICATIONS

RxLogger Settings—Zebra Technologies TechDocs, https://techdocs.zebra.com/rxlogger/7-0/guide/settings/, Jul. 10, 2024, 7 pages.

* cited by examiner

ELECTRONIC APPARATUS FOR LOGGING, NON-TRANSITORY COMPUTER-READABLE RECORD MEDIUM FOR LOGGING, AND LOGGING METHOD

CROSS-REFERENCE TO RELATED PATENT APPLICATION

This application claims the benefit of priority to the China Patent Application No. 202311845299.6, filed on Dec. 29, 2023. The entire content of the China Patent Application No. 202311845299.6 is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The present invention relates to an electronic apparatus, a logging method, and a non-transitory computer-readable record medium.

BACKGROUND OF THE INVENTION

In the software application of the logging tool, logging typically requires several hours or days for data collection. However, during logging, the user still needs to continue operating a computer. Therefore, when the logging tool starts to operate in the background, it is difficult for the user to grasp the recording status and thus, the situation where the logging is still ongoing is always overlooked. Additionally, during background operation, the user cannot perform related functional operations, for example, pressing the stop key, the annotation key, and the like. Therefore, how to quickly grasp the recording status during background logging and reduce operational uncertainties for the user is the main task to be resolved in this technical field.

SUMMARY OF THE INVENTION

The present invention provides an electronic apparatus, a non-transitory computer-readable record medium, and a logging method, which allow for logging in background, quick grasp on the recording status, and can reduce the operation doubts of the user.

The electronic apparatus provided by the present invention is configured to execute the logging program stored on the non-transitory computer-readable record medium. The executing includes the following steps: recording a log into a log document with an enabling button; shrinking a logging program to background with a shrinking button and generating a floating window toolbar, where the floating window toolbar includes the enabling button and at least one system exception capture button; determining whether the electronic apparatus has experienced an exception; executing an exception annotation with the at least one system exception capture button when a determining result is yes; storing the exception annotation into a time series of the log document; determining whether there is the exception annotation in the log document; and displaying a log segment corresponding to the exception annotation when a determining result is yes.

The non-transitory computer-readable record medium provided by the present invention includes the logging program. After the electronic apparatus executes the logging program, the following steps are performed: recording a log into a log document with an enabling button; shrinking a logging program to background with a shrinking button and generating a floating window toolbar, where the floating window toolbar includes the enabling button and at least one system exception capture button; determining whether the electronic apparatus has experienced an exception; executing an exception annotation with the at least one system exception capture button when a determining result is yes; storing the exception annotation into a time series of the log document; determining whether there is the exception annotation in the log document; and displaying a log segment corresponding to the exception annotation when a determining result is yes.

The logging method provided by the present invention is suitable for and executed by the electronic apparatus. The method includes the following steps: recording a log into a log document with an enabling button; shrinking a program of the logging method to background with a shrinking button and generating a floating window toolbar, where the floating window toolbar includes the enabling button and at least one system exception capture button; determining whether the electronic apparatus has experienced an exception; executing an exception annotation with the at least one system exception capture button when a determining result is yes; storing the exception annotation into a time series of the log document; determining whether there is the exception annotation in the log document; and displaying a log segment corresponding to the exception annotation when a determining result is yes.

In an embodiment of the present invention, the at least one system exception capture button is an annotation button used for executing the exception annotation based on situation determining, the situation determining being start error determining.

In an embodiment of the present invention, the at least one system exception capture button is an annotation button used for executing the exception annotation based on situation determining, the situation determining being hiatus exception determining.

In an embodiment of the present invention, the at least one system exception capture button is a screen capture button used for executing the exception annotation based on situation determining, the situation determining being visual-interface and system-display exception determining.

In an embodiment of the present invention, the electronic apparatus includes a touchscreen display to show the enabling button and the at least one system exception capture button.

In the present invention, with the use of the shrinking button to shrink the program of the logging method, the user can perform background logging, quickly grasp the recording status through the design of the floating window toolbar, and directly tap buttons such as a stop button to trigger related key functions. The present invention reminds the user of the recording status and reduces operational uncertainties for the user, and allows for better operational experience through movable operation and shrinkage to the background for execution.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

To make the objectives, technical solutions, and advantages of the present invention more comprehensible, the following describes the present invention in detail with reference to embodiments and accompanying drawings. It should be understood that the specific embodiments described herein are merely used to explain the present invention but are not intended to limit the present invention. All other embodiments obtained by persons skilled in the art based on the embodiments of the present invention without creative efforts shall fall within the protection scope of present invention.

Figure 1:
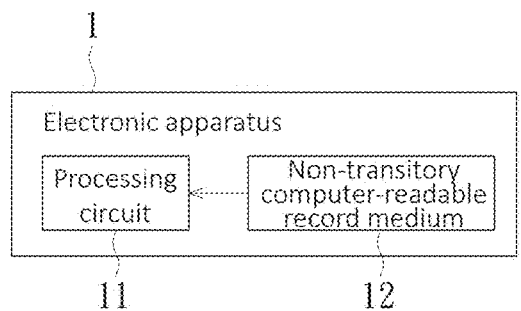
FIG. 1 is a schematic diagram of an electronic apparatus according to an embodiment of the present invention.

FIG. 1 is a schematic diagram of an electronic apparatus according to an embodiment of the present invention. The electronic apparatus 1 provided in this embodiment includes a processing circuit 11 and a non-transitory computer-readable record medium 12 coupled to the processing circuit 11. The electronic apparatus 1 may be a computing apparatus such as a personal computer, a laptop, or a tablet, which includes a touchscreen display to show an enabling button and at least one system exception capture button. The non-transitory computer-readable record medium 12 is used to store a program of a logging method and the processing circuit 11 is used to execute the program of the logging method. The log can be used for recording events and error situations that may occur during system execution of the electronic apparatus 1.

Figure 2:
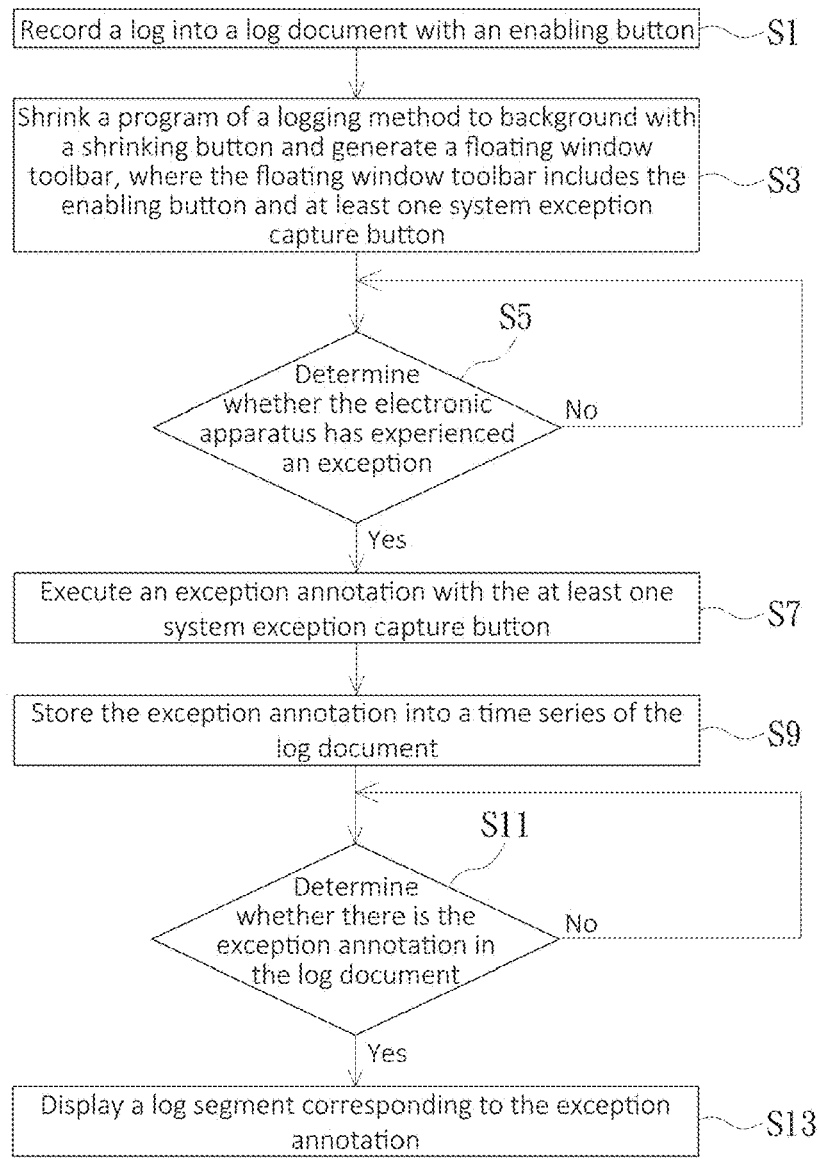
FIG. 2 is a flowchart of a logging method according to an embodiment of the present invention.
Figure 3:
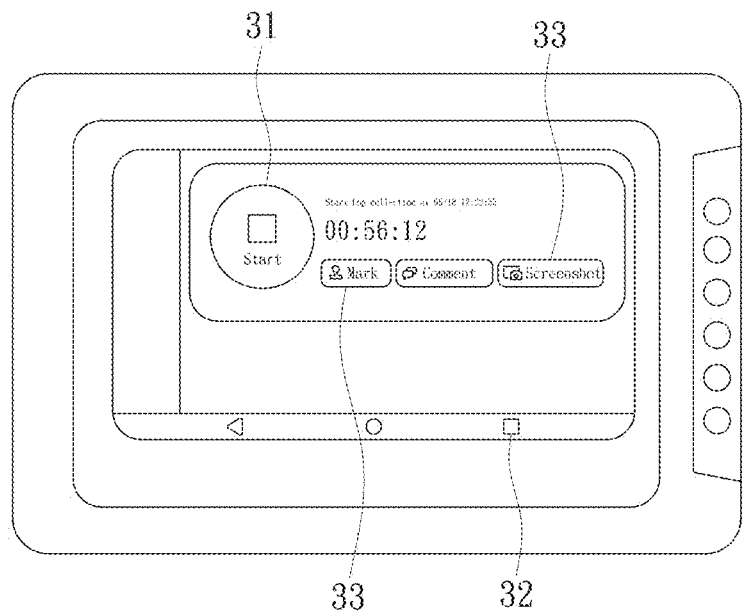
FIG. 3 is a schematic diagram of a first user interface according to an embodiment of the present invention.

FIG. 2 is a flowchart of a logging method according to an embodiment of the present invention. The logging method provided in this embodiment includes the following steps: Step S1: Record a log into a log document with an enabling button. Specifically, FIG. 3 is a schematic diagram of a first user interface according to an embodiment of the present invention. The user can tap the enabling button (start) 31 on the touchscreen display of an electronic apparatus 1 for logging.

Figure 4:
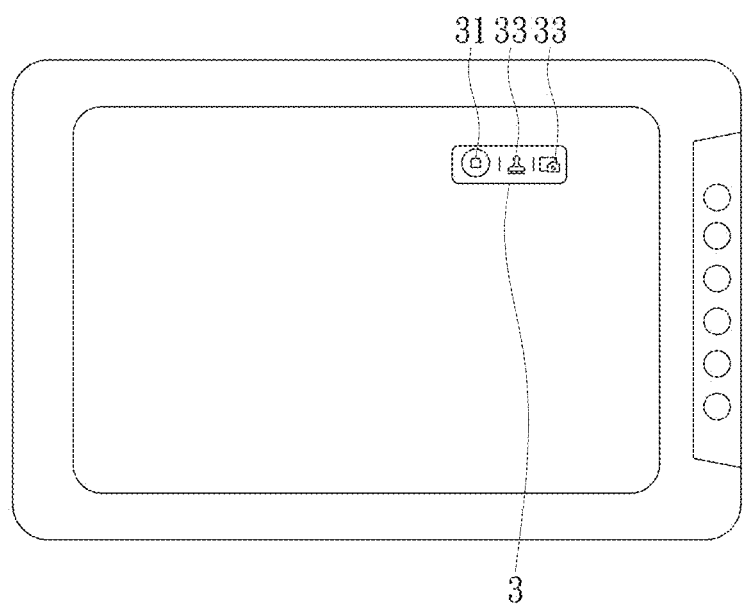
FIG. 4 is a schematic diagram of a second user interface according to an embodiment of the present invention.

Step S3: Shrink a program of the logging method to background with a shrinking button and generate a floating window toolbar, where the floating window toolbar includes the enabling button and at least one system exception capture button. Specifically, FIG. 4 is a schematic diagram of a second user interface according to an embodiment of the present invention. The user can tap a shrinking button 32 on the touchscreen display of the electronic apparatus 1 to shrink a program of the logging method to background and generate a floating window toolbar 3, where the floating window toolbar 3 includes the enabling button 31 and at least one system exception capture button 33. It may be noted that the sequences of steps S1 and S3 may be exchanged, and the user can tap the enabling button (start) 31 in the floating window toolbar 3 for logging.

Figure 5:
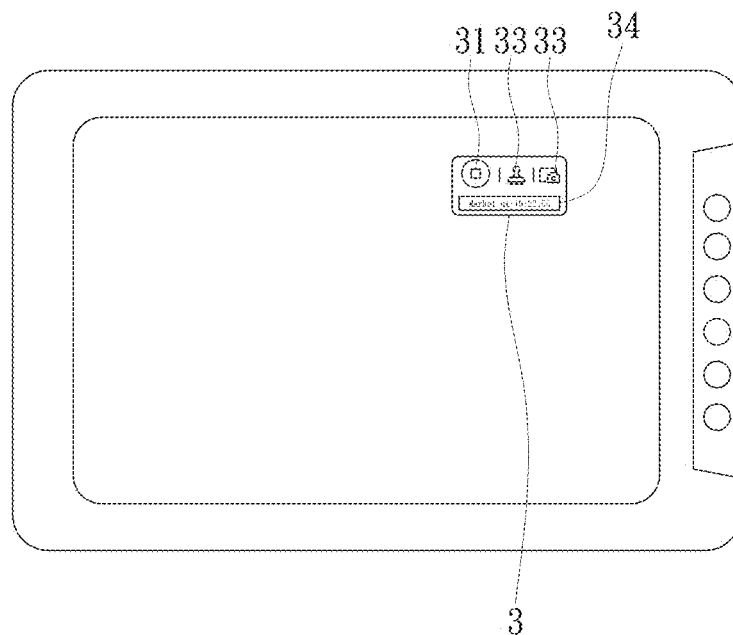
FIG. 5 is a schematic diagram of a third user interface according to an embodiment of the present invention.

Step S5: Determine whether the electronic apparatus has experienced an exception. Step S7: Execute an exception annotation with the at least one system exception capture button when a determining result is yes. Step S9: Store the exception annotation into a time series of the log document. Specifically, FIG. 5 is a schematic diagram of a third user interface according to an embodiment of the present invention. When the user determines the occurrence of exception event and error situation during system execution of the electronic apparatus 1, the user can tap the at least one system exception capture button 33 in the floating window toolbar 3 to generate exception annotations about the exception event and error situation. And the touchscreen display of the electronic apparatus 1 displays the current timestamps 34 of the exception event and error situation and the exception annotations are stored into a time series of the log document. It can be noted that the system exception capture button 33 may be an annotation button (annotation) used for executing the exception annotation based on situation determining, the situation determining being start error determining or hiatus exception determining. For example, the start error determining may be determining of error, pause, inactivity, or the like when a program is started, and the hiatus exception determining may be determining of error, pause, inactivity, or the like when execution of the program is stopped. The system exception capture button 33 may be a screen capture button (screenshot) used for executing the exception annotation based on situation determining, the situation determining being visual-interface and system-display exception determining. For example, the visual-interface and system-display exception determining may be determining of failure, pause, inactivity, or the like on a display screen of a program.

Step S11: Determine whether there is the exception annotation in the log document. Specifically, after the user taps the enabling button (stop) 31, the electronic apparatus 1 stops logging and determines whether there is the exception annotation in the log document.

Figure 6:
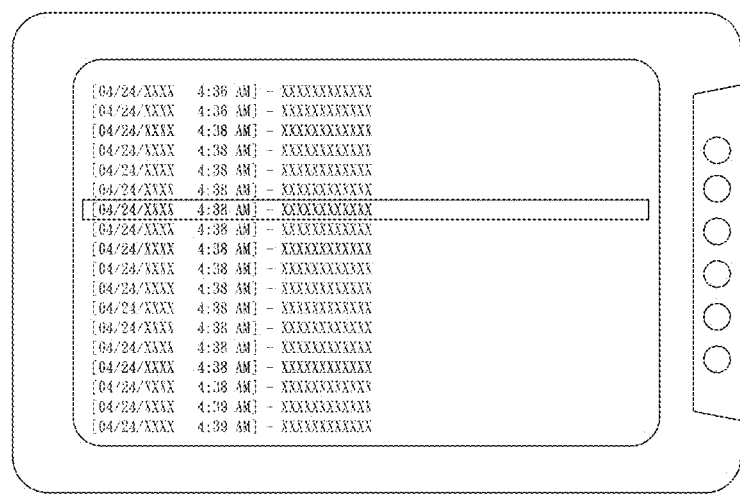
FIG. 6 is a schematic diagram of a log document according to an embodiment of the present invention.

Step S13: Display a log segment corresponding to the exception annotation when a determining result is yes. Specifically, FIG. 6 is a schematic diagram of a log document according to an embodiment of the present invention. When it is determined that there is the exception annotation in the log document, the electronic apparatus 1 shows the log segment corresponding to the exception annotation on the touchscreen display for the user to check exception event and error situation, so as to accelerate check for exception event and error situation by the user.

In addition, it can be noted that the floating window toolbar 3 of the logging method provided in this embodiment is arbitrarily movable on the touchscreen display. In other words, the user may tap the floating window toolbar 3 and move it to any position of the touchscreen display, or may place the electronic apparatus 1 horizontally or vertically, such that the floating window toolbar 3 appears in a corresponding position on the touchscreen display. For example, when the electronic apparatus 1 is placed horizontally, the floating window toolbar 3 is located in the top-left corner of the touchscreen display, and when the electronic apparatus 1 is placed vertically, the floating window toolbar 3 is correspondingly located in the top-left corner of the touchscreen display. By analog, the floating window toolbar 3 being in another position of the touchscreen display is not elaborated herein.

In summary, in the present invention, with the use of the shrinking button to shrink the program of the logging method, the user can perform background logging, quickly grasp the recording status through the design of the floating window toolbar, and directly tap buttons such as a stop button to trigger related key functions. The present invention reminds the user of the recording status and reduces the operational uncertainties for the user, and allows for better operational experience through movable operation and shrinkage to the background for execution.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-transitory computer-readable record medium, comprising a logging program, wherein after the logging program is executed by an electronic apparatus, the following steps are performed:
   recording a log into a log document by using an enabling button;
   shrinking the logging program to background by using a shrinking button and generating a floating window toolbar, wherein the floating window toolbar comprises the enabling button and at least one system exception capture button;
   determining whether the electronic apparatus has experienced an exception;
   executing an exception annotation by using the at least one system exception capture button when it is determined that the electronic apparatus has experienced the exception, wherein the exception annotation comprises timestamps of an exception event and an error situation, the at least one system exception capture button is an annotation button used for executing the exception annotation based on situation determining, and the situation determining is an occurrence of start error determining or hiatus exception determining;
   storing the exception annotation into a time series of the log document;
   determining whether there is the exception annotation in the log document; and
   displaying a log segment corresponding to the timestamps of the exception event and the error situation in the exception annotation when it is determined that there is the exception annotation in the log document.

2. The non-transitory computer-readable record medium according to claim 1, wherein the at least one system exception capture button is a screen capture button used for executing the exception annotation based on the situation determining, and the situation determining is a visual-interface and system-display exception determination.

3. The non-transitory computer-readable record medium according to claim 1, wherein the electronic apparatus comprises a touchscreen display to show the enabling button and the at least one system exception capture button.

4. An electronic apparatus, configured to execute a logging program stored on a non-transitory computer-readable record medium, wherein the executing comprises the following steps:
   recording a log into a log document by using an enabling button;
   shrinking the logging program to background by using a shrinking button and generating a floating window toolbar, wherein the floating window toolbar comprises the enabling button and at least one system exception capture button;
   determining whether the electronic apparatus has experienced an exception;
   executing an exception annotation by using the at least one system exception capture button when it is determined that the electronic apparatus has experienced the exception, wherein the exception annotation comprises timestamps of an exception event and an error situation, the at least one system exception capture button is an annotation button used for executing the exception annotation based on situation determining, and the situation determining is an occurrence of start error determining or hiatus exception determining;
   storing the exception annotation into a time series of the log document;
   determining whether there is the exception annotation in the log document; and
   displaying a log segment corresponding to the timestamps of the exception event and the error situation in the exception annotation when it is determined that there is the exception annotation in the log document.

5. The electronic apparatus according to claim 4, wherein the at least one system exception capture button is a screen capture button used for executing the exception annotation based on the situation determining, and the situation determining is a visual-interface and system-display exception determination.

6. The electronic apparatus according to claim 4, wherein the electronic apparatus comprises a touchscreen display to show the enabling button and the at least one system exception capture button.

7. A logging method suitable for and executed by an electronic apparatus, wherein the logging method comprises the following steps:
   recording a log into a log document by using an enabling button;
   shrinking a program of the logging method to background by using a shrinking button and generating a floating window toolbar, wherein the floating window toolbar comprises the enabling button and at least one system exception capture button;
   determining whether the electronic apparatus has experienced an exception;
   executing an exception annotation by using the at least one system exception capture button when it is determined that the electronic apparatus has experienced the exception, wherein the exception annotation comprises timestamps of an exception event and an error situation, the at least one system exception capture button is an annotation button used for executing the exception annotation based on situation determining, and the situation determining is an occurrence of start error determining or hiatus exception determining;
   storing the exception annotation into a time series of the log document;
   determining whether there is the exception annotation in the log document; and displaying a log segment corresponding to the timestamps of the exception event and the error situation in the exception annotation when it is determined that there is the exception annotation in the log document.

8. The logging method according to claim 7, wherein the at least one system exception capture button is a screen capture button used for executing the exception annotation based on the situation determining, and the situation determining is a visual-interface and system-display exception determination.

9. The logging method according to claim 7, wherein the electronic apparatus comprises a touchscreen display to show the enabling button and the at least one system exception capture button.

\* \* \* \* \*